(12) United States Patent
Parrish et al.

(10) Patent No.: US 7,047,503 B1
(45) Date of Patent: May 16, 2006

(54) METHOD AND APPARATUS FOR THE SELECTION OF RECORDS

(75) Inventors: Jeff W. Parrish, Los Altos, CA (US); E. Michael Lunsford, San Carlos, CA (US)

(73) Assignee: PalmSource, Inc., Sunnyvale, CA (US)

( * ) Notice: Subject to any disclaimer, the term of this patent is extended or adjusted under 35 U.S.C. 154(b) by 595 days.

(21) Appl. No.: 09/821,423

(22) Filed: Mar. 28, 2001

(51) Int. Cl.
*G06F 3/01* (2006.01)

(52) U.S. Cl. .................. 715/863; 715/503

(58) Field of Classification Search ........ 345/427, 345/419; 715/823, 856, 863, 503; 379/106.03; 338/114; 33/561
See application file for complete search history.

(56) References Cited

U.S. PATENT DOCUMENTS

| | | | | |
|---|---|---|---|---|
| 4,933,660 A | * | 6/1990 | Wynne, Jr. | 338/114 |
| 5,319,858 A | * | 6/1994 | Coy | 33/561 |
| 5,359,703 A | * | 10/1994 | Robertson et al. | 345/419 |
| 5,608,850 A | * | 3/1997 | Robertson | 345/427 |
| 5,699,089 A | * | 12/1997 | Murray | 345/823 |
| 6,240,167 B1 | * | 5/2001 | Michaels | 379/106.03 |
| 6,396,474 B1 | * | 5/2002 | Johnson et al. | 345/856 |

OTHER PUBLICATIONS

Chester, Thomas, and Robert Alden, Mastering Excel 97, 1997, Sybex, 4th Edition, pp. 66-67.*

* cited by examiner

*Primary Examiner*—Stephen Hong
*Assistant Examiner*—Adam M. Queler
(74) *Attorney, Agent, or Firm*—Berry & Associates P.C.

(57) ABSTRACT

An improved method and system for record selection. Specifically, one embodiment of the present invention interprets the "gesture" of swiping the pen horizontally across a line-item of a record entry as a command to highlight the line-item and to select the entire record. Furthermore, a contiguous group of multiple records are highlighted and selected by selecting the first record, as above, and then continuing to swipe the pen vertically through the records, in accordance with another embodiment. Lastly, discontiguous records are selected by repeating the above sequence for two or more discontiguous groups of records. Previous selections are maintained until the user executes any other non-selection action.

16 Claims, 9 Drawing Sheets

100a

100b

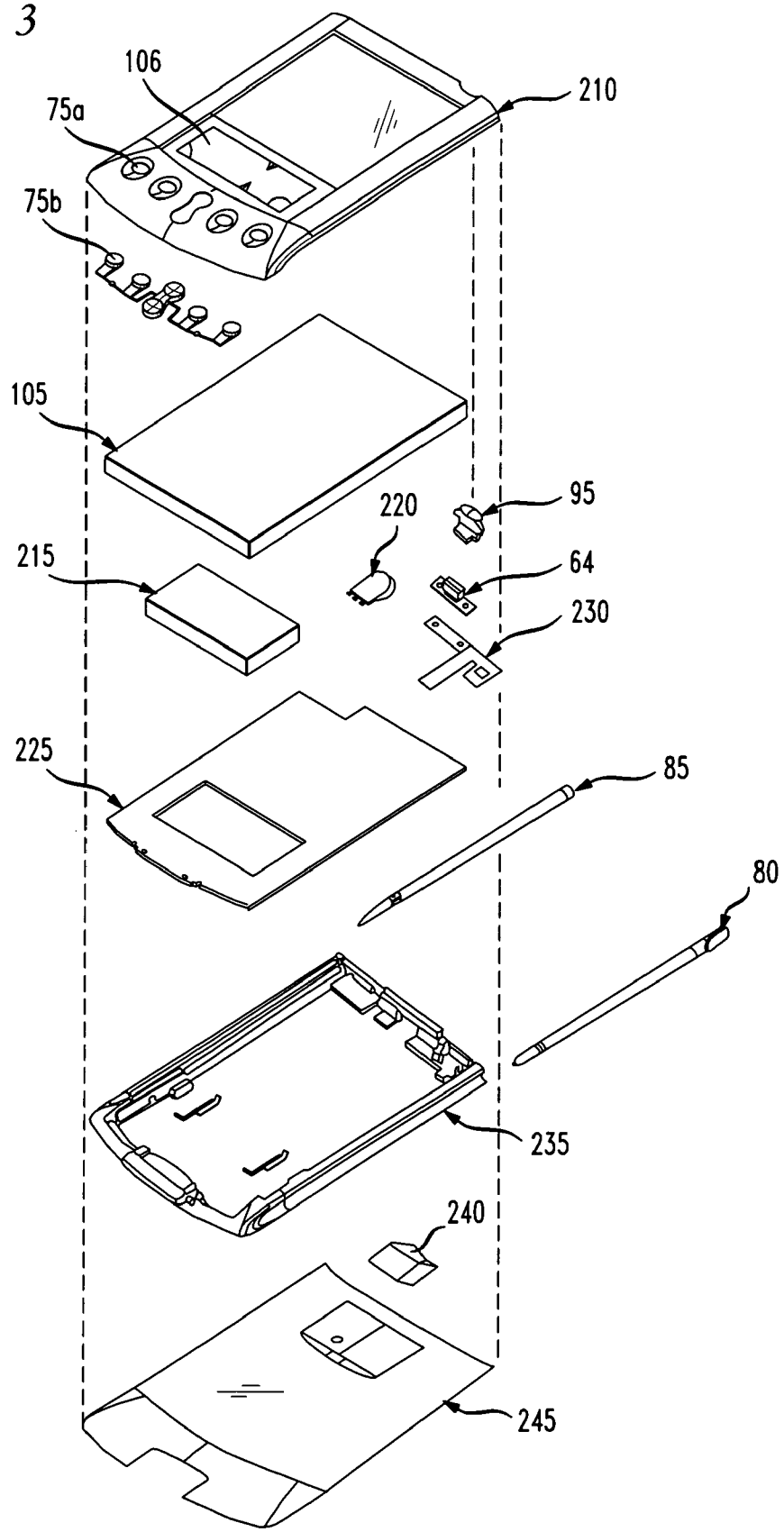

METHOD AND APPARATUS FOR THE SELECTION OF RECORDS

BACKGROUND OF THE INVENTION

1. Field of the Invention

The present invention relates to the field of selecting record entries on an electronic device.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." Most palmtop computer systems are used to implement various personal information management (PIM) applications such as an address book, a daily organizer, scheduling calendar, and electronic notepads, to name a few. Palmtop computers with PIM software have been known as Personal Digital Assistants (hereinafter referred to as "PDAs").

Heretofore, selection of an entire record by a user for some action to be performed on the record entry involved complicated or unfriendly user interactions. These actions, such as deleting, reclassifying, or copying of a record entry, usually required complicated steps to be performed by the user. Further, the complexity and amount of time needed may dissuade the user from performing the actions. Additionally, selection of multiple record entries for further action was not possible.

For example, from a display of line-items of record entries for an application, such as an address book, to reach a display with options such as deleting, or re-categorizing, or copying a record entry may require a minimum of three steps. First, the record entry must be opened by tapping on the line-item. Second, the "edit" window must be selected by tapping on the "edit" window. Third, a "details" window must be selected by tapping on the "details" window to reach the option windows, such as a window for deletion, or to copy the record entry.

As shown, reaching some options for actions to be taken on an entire record entry may require numerous and complicated steps. Moreover, tapping on a line-item of a record entry is interpreted as a command to open the record entry and not merely as a selection of the line-item of the single record entry. Also, multiple selection of record entries is not possible since only a single record entry can be opened at a certain time.

Previously, an unsuccessful attempt was made for selecting line-items of record entries based on time. The action of holding a stylus down on a display or a line-item for a specific period of time would determine the action to be performed on the record entry of that line-item, such as the selection of an single record entry. The approach was unfriendly to the user because it gave the user a detached sense from the action to be taken. In other words, the user had to wait while holding the stylus down on the PDA to perform an action on the PDA that seemed quite simple. The more time the user waited, it seemed that more time was wasted by the user.

Thus, a need exists for a more user-friendly and less complicated mechanism for selecting record entries. Also, a need exists for a more efficient mechanism for performing actions on multiple record entries.

SUMMARY OF THE INVENTION

The present invention discloses an improved method and system for record selection. Accordingly, the present invention discloses a direct mechanism that is uncomplicated and user-friendly for selecting a single record entry or multiple record entries in line-item form from a display of line-items of record entries. Also, the present invention provides for a more efficient mechanism for performing action on multiple record entries.

Specifically, the present invention discloses a method and system for selecting multiple records as displayed. One embodiment of the present invention interprets the "gesture" of swiping the pen across a line-item of a record entry as a command to highlight the line-item and to select the entire record. During the swipe, the pen or stylus is down. Furthermore, a contiguous group of multiple records is automatically highlighted and selected by selecting the first record, as above, and then continuing to swipe the pen down through the records, in accordance with another embodiment. Lastly, discontiguous records are selected by repeating the above sequence for two or more discontiguous groups of records. Previous selections are maintained until the user executes any other non-selection action.

In one embodiment, selection of a single record entry from a plurality of record entries in line-item form displayed on an electronic device is described. The electronic device recognizes a contact point outside a line-item of a record entry that is captured on a digitizer associated with the display. This contact point marks a start point on a first record entry. Continuous movement of the pressure horizontally, from left to right, across the line-item of the first record entry is recognized by the electronic device to an end point. The pen is down from start point to end point. That line-item of the record entry is automatically highlighted and the entire record is automatically selected as long as the distance between the start point and the end point exceeds a pre-defined distance. Slight vertical deviations are also allowed.

Furthermore, selection of multiple and contiguous record entries is simply an extension of the selection of a single record. After an electronic device recognizes the selection of a first record entry as illustrated above, the electronic device recognizes the continuous movement of the pressure vertically to a second record entry. Selection of all contiguous record entries between the first and second record entries, including the first and second record entries, automatically occurs. Thus, the line-items representing the first contiguous group of record entries are highlighted and those associated entire records are selected.

Moreover, previous selections of record entries are maintained until an action not associated with record selection is recognized. This allows for the selection of a plurality of contiguous groups of record entries by applying the aforementioned selection of a first contiguous group of record entries over and over to select a plurality of contiguous groups of record entries.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 3 is a bottom side perspective view of the palmtop computer system of FIG. 2.

DETAILED DESCRIPTION OF THE INVENTION

Figure 1A:
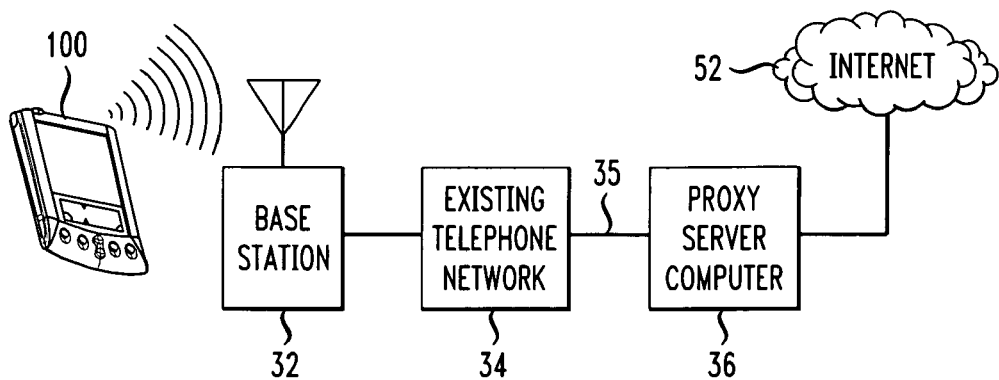
FIG. 1A illustrates a block diagram of a first exemplary network environment including a personal digital assistant in accordance with an embodiment of the present invention.

Reference will now be made in detail to the preferred embodiments of the present invention, an improved method and apparatus for record selection, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The present invention is compatible with any electronic device having a screen. One of the common types of electronic systems which can be used in accordance with one embodiment of the present invention is referred to as a personal digital assistant, or commonly called a PDA. The PDA is a pocket sized electronic organizer with the capability to store telephone numbers, addresses, daily appointment, and software that keeps track of business or personal data such as expenses, etc. Furthermore, the PDA also has the ability to connect to a personal computer, enabling the two devices to exchange updated information, that is synchronize the information between the two devices.

Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface). In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

FIG. 1A is a block diagram of an exemplary network environment 50 including an exemplary personal digital assistant 100. The PDA 100 is also known as a palmtop or palm-sized electronic system or computer system. The PDA 100 has the ability to transmit and receive data and information over a wireless communication interface (e.g., a radio interface). The PDA 100 is one exemplary implementation on which the present invention can operate. The present invention can operate on any portable electronic system or device.

In one embodiment, base station 32 is both a transmitter and receiver base station which can be implemented by coupling it into an existing public telephone network 34. Implemented in this manner, base station 32 enables the personal digital assistant 100 to communicate with a proxy serer computer system 36, which is coupled by wire 35 to the existing public telephone network 34. Furthermore, proxy server computer system 36 is coupled to the Internet 52, thereby enabling the PDA 100 to communicate with the Internet 52. It should be further appreciated that other embodiments of a communications network may be utilized in accordance with the present invention.

The data and information which are communicated between base station 32 and the personal digital assistant 100 are a type of information and data that can conventionally be transferred and received over a public telephone wire network system. However, a wireless communication interface is utilized to communicate data and information between the PDA 100 and base station 32. It should be appreciated that one embodiment of a wireless communication system in accordance with the present invention is the Mobitex wireless communication system.

Figure 1B:
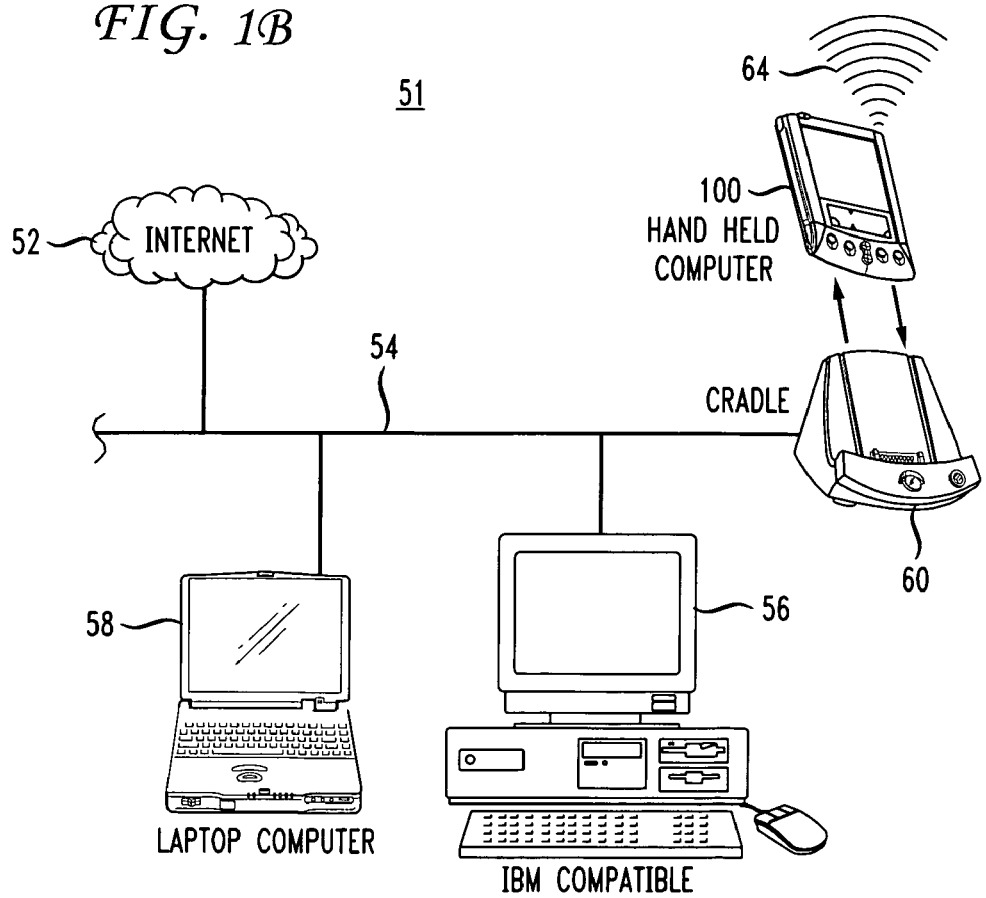
FIG. 1B illustrates a block diagram of a second exemplary network environment including a personal digital assistant coupled to other computer systems and the Internet via a cradle device in accordance with an embodiment of the present invention.

FIG. 1B illustrates a system 51 that can be used in conjunction with the present invention. System 51 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a personal digital assistant 100 in one embodiment of the present invention. Cradle 60 provides an electrical and mechanical communication interface between bus 54 (and anything coupled to bus 54) and the computer system 100 for two way communications. Computer system 100 also contains a wireless infrared communication mechanism 64 (e.g., an infrared emitter and detector device) for sending and receiving information from other similarly equipped devices (see FIG. 1B).

With reference to FIGS. 1A and 1B, it is appreciated that the exemplary personal digital assistant or palmtop computer system 100 can be used in network environments combining elements of networks 50 and 51. That is, as will be seen below, the PDA 100 can include both a wireless infrared communication mechanism and a signal (e.g., radio) receiver/transmitter device.

Figure 2A:
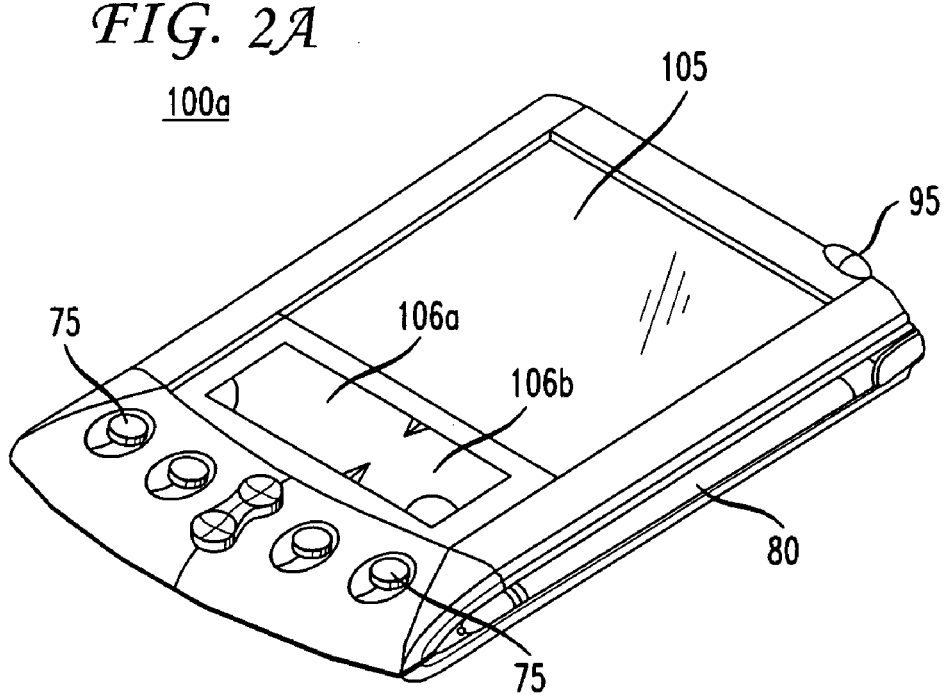
FIG. 2 is a top side perspective view of a palmtop computer system in accordance with an embodiment of the present invention.
Figure 2B:
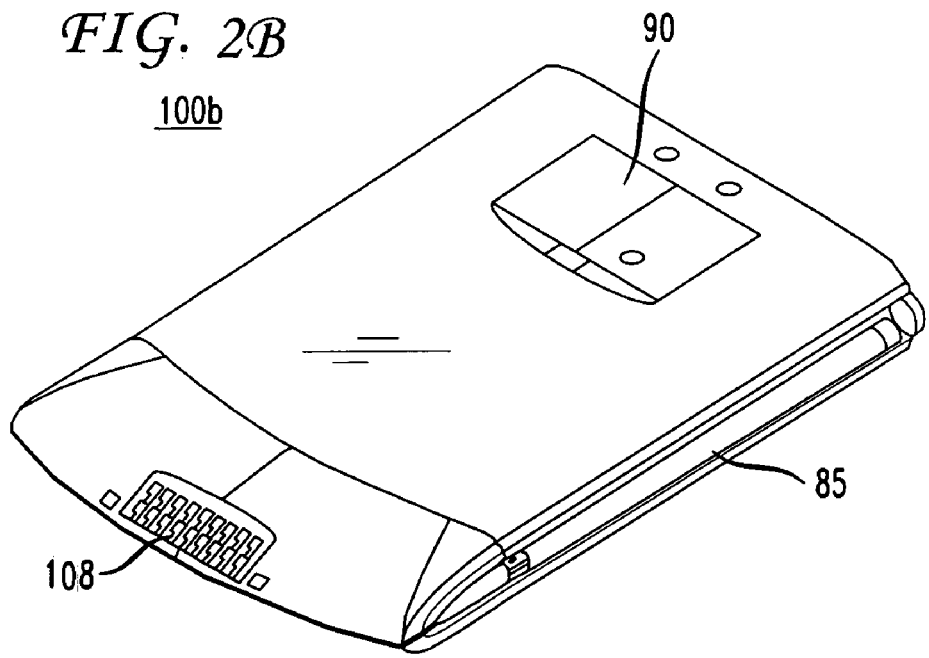

FIG. 2 is a perspective illustration of the top face 100a of one embodiment of the palmtop computer system. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 10a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a or 106b. The stroke information is then fed to an internal processor for automatic character recognition. Once characters are recognized, they are typically displayed on the screen for verification and/or modification.

FIG. 3 illustrates the bottom side 100b of one embodiment of the palmtop computer system. An optional extendible antenna 85 is shown and also a battery storage compartment door 90 is shown. A communication interface 108 is also shown. In one embodiment of the present invention, the communication interface 108 is a serial communication port, but could also alternatively support any of a number of well known communication standards and protocols, e.g., parallel, USB, SCSI, Firewire (IEEE 1394), Ethernet, etc. It is appreciated that interface 108 can also be used for charging current when using rechargeable batteries.

Figure 4:
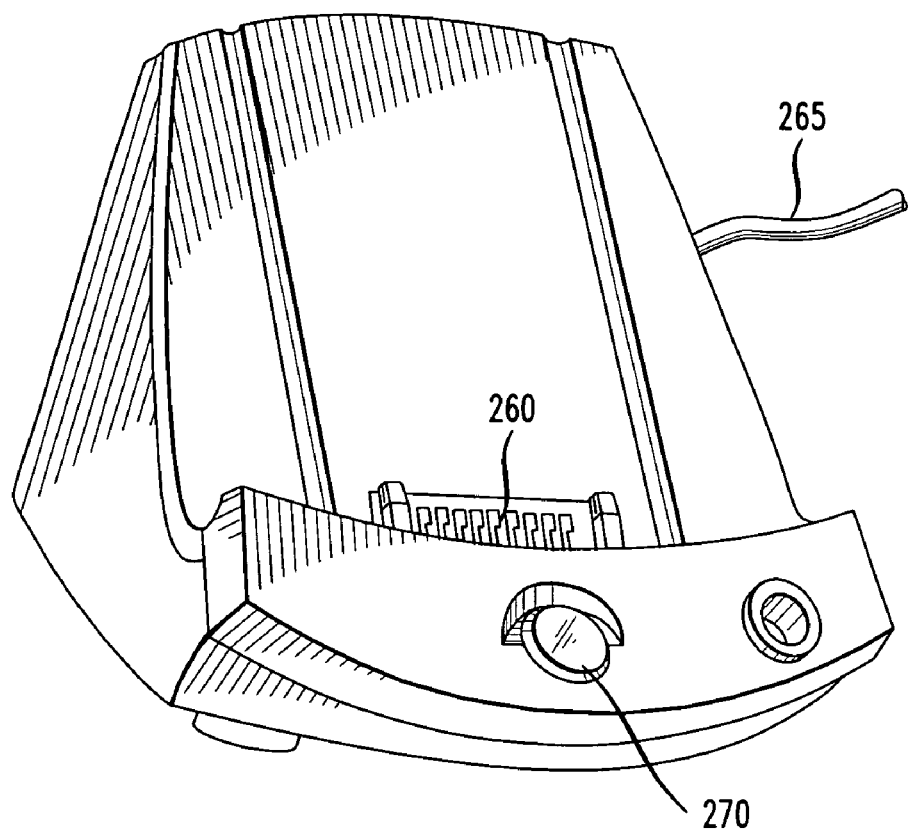
FIG. 4 is a perspective view of the cradle device for connecting the palmtop computer system to other systems via a communication interface in accordance with an embodiment of the present invention.

FIG. 4 is a perspective illustration of one embodiment of the cradle 60 for receiving the palmtop computer system 100. Cradle 60 contains a mechanical and electrical interface 260 for interfacing with communication interface 108 (FIG. 2B) of computer system 100 when system 100 is slid into the cradle 60 in an upright position. Once inserted, button 270 can be pressed to initiate two way communication between system 100 and other computer systems coupled to electrical interface cable 265.

Figure 5:
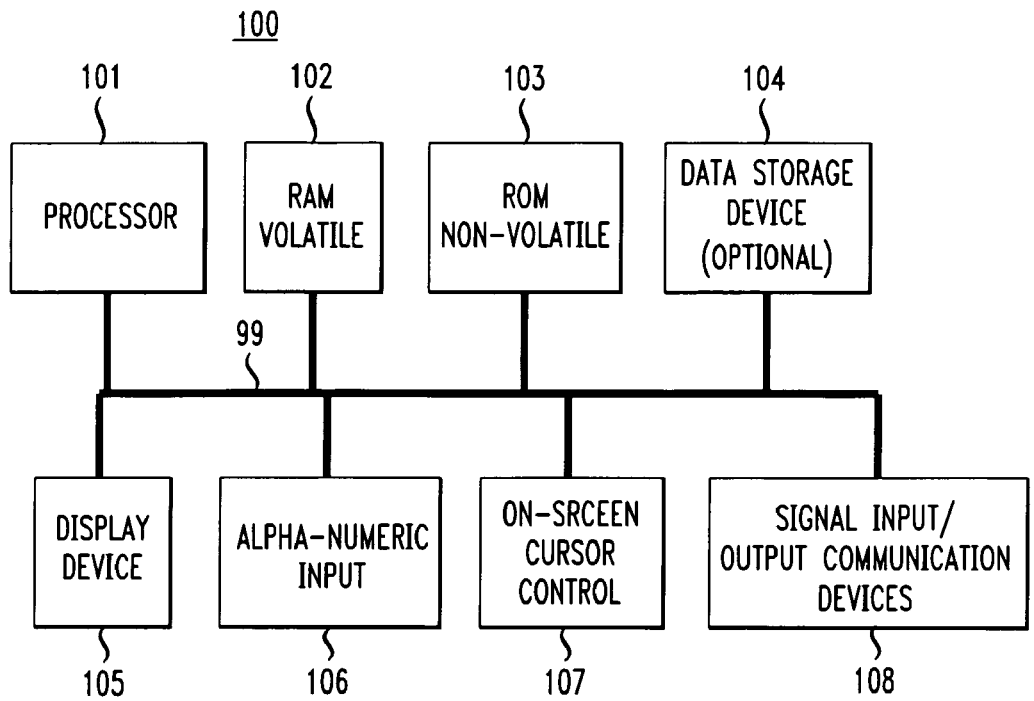
FIG. 5 is a logical block diagram of the palmtop computer system in accordance with an embodiment of the present invention.

Referring now to FIG. 5, portions of the present electronic system are comprised of computer-readable and computer-executable instructions which reside, for example, in computer-readable media of an electronic system (e.g., personal digital assistant, computer system, and the like). Although the functional faceplate of the present invention can be implemented in a variety of different electronic systems such as a pager, a cell phone, a remote control device, etc., one exemplary embodiment includes the integration of the faceplate with a portable electronic device or PDA. FIG. 5 is a block diagram of exemplary interior components of an exemplary personal digital assistant 100 upon which embodiments of the present invention may be implemented.

FIG. 5 illustrates circuitry of an exemplary portable computer system 100. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101.

Computer system 100 also includes an optional data storage device 104 (e.g., thin profile removable memory) coupled with the bus 99 for storing information and instructions. Device 104 can be removable. Device 104 may also be an SDROM card reader or equivalent removable memory reader.

Also included in computer system 100 of FIG. 5 is an alphanumeric input device 106 which in one implementation is a handwriting recognition pad ("digitizer") and may include integrated push buttons in one embodiment. Device 106 can communicate information (spatial data and pressure data) and command selections to the central processor 101. The digitizer 106 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101. In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 for later analysis.

System 100 of FIG. 5 also includes an optional cursor control or directing device 107 coupled to the bus for communicating user input information and command selections to the central processor 101. In one implementation, device 107 is a touch screen device (also a digitizer) incorporated with screen 105. Device 107 is capable of registering a position on the screen 105 where the stylus makes contact and the pressure of the contact. The digitizer of 106 or 107 can be implemented using well known devices, for instance, using the ADS-7846 device by Burr-Brown that provides separate channels for spatial stroke information and pressure information.

System 100 also contains a flat panel display device 105 coupled to the bus 99 for displaying information to the computer user. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. Any of a number of display technologies can be used, e.g., LCD, FED, plasma, etc., for the flat panel display 105. In one embodiment, the display 105 is a flat panel multi-mode display capable of both monochrome and color display modes.

Signal communication device 108, also coupled to bus 99, can be a serial port (or USB port) for communicating with a cradle. In one embodiment, the serial communication interface 108 is a serial communication port, but could also alternatively be of any of a number of well known communication standards and protocols, e.g., parallel, SCSI, Firewire (IEEE 1394), Ethernet, etc. In addition to device 108, wireless communication links can be established between the device 100 and a host computer system (or another portable computer system) using a Bluetooth wireless device 360, an infrared device 355, or a GSM radio device 240. Device 100 may also include a wireless modem device 240 and/or a wireless radio, e.g., a GSM wireless radio with supporting chipset. The wireless modem device 240 is coupled to communicate with the processor 101 but may not be directly coupled to port 108.

In one implementation, the Mobitex wireless communication system may be used to provide two way communication between system 100 and other networked computers and/or the Internet, e.g., via a proxy server. In other embodiments, TCP protocol can be used or SMS can be used. System 100 of FIG. 5 may also contain batteries for providing electrical power.

Selecting Record Entries

Although the description of the present invention will focus on an exemplary personal digital assistant (hereinafter referred to as "PDA") or palmtop computer system, embodiments of the present invention can be practiced with other electronic systems or electronic devices (e.g., personal computer systems, cellular phones, pagers, portable web devices, etc.).

Figure 6:
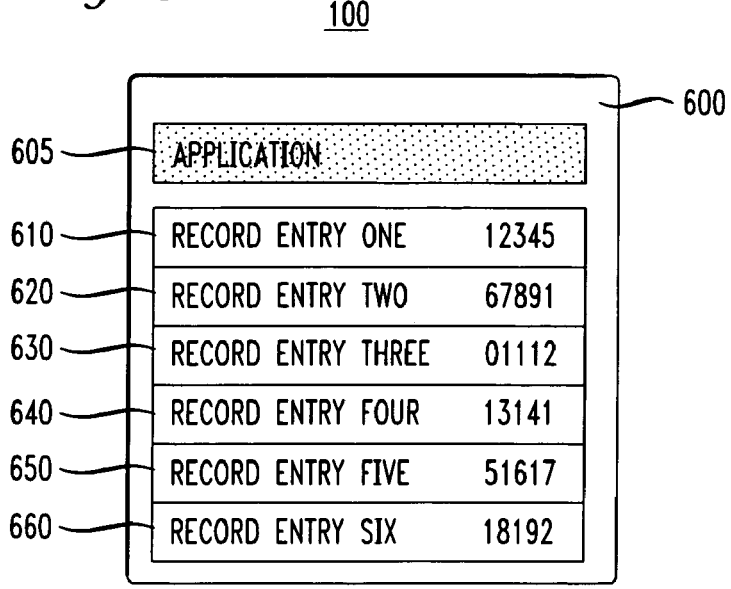
FIG. 6 is a front view of a palm top computer system illustrating the display screen, and a generalized form of record entries in line-item form, in accordance with an embodiment of the present invention.

FIG. 6 is a front view of a palm top computer system illustrating an exemplary display screen 600 showing a generalized form of a record entries in line-item form, in accordance with an embodiment of the present invention. In this display, multiple records of a database have been represented as line-items shown on the display screen. Each line-item, or label, represents the entire record. The record entries are associated with any application 605 on electronic device 100. Application 605 has the following generalized record entries in line-item form: record entry one 610, record entry two 620, record entry three 630, record entry four 640, record entry five 650 and record entry six 660. It is appreciated that display 600 is exemplary only and that display 600 may contain one or more record entries. It is also appreciated the present invention can accommodate any suitable method for displaying simultaneously multiple records of a database.

Continuing with FIG. 6, application 605 can be an address book application, for example. In that case, record entry one 620 may contain a name on the left side of the line-item. The name is associated with a phone number that can be displayed on the right side of the line-item, as represented by "12345." It is appreciated that any format can be used in the line-item to represent the associated record entry.

Selection of the record entries in line-item form is convenient for performing further actions on each of the selected record entries. These actions include deleting, copying, beaming, re-categorizing, or any other action capable of being performed on a record entry that is supported by the operating software that runs the electronic device associated with the record entries.

Further, there are many situations where simple operations on multiple records become tedious. The most obvious examples are the deletion or copying of multiple records in an address book application or a memo application. For instance, previously, if a record entry in line-item form is tapped, the entire record entry is opened. Further action can be taken on the record entry by navigating through the necessary prompts. To effect changes to multiple records requires following this process record by record on an individual basis. Selecting multiple records in line-item form removes the tedium, complexity, and the consumption of time from these operations.

Figure 7:
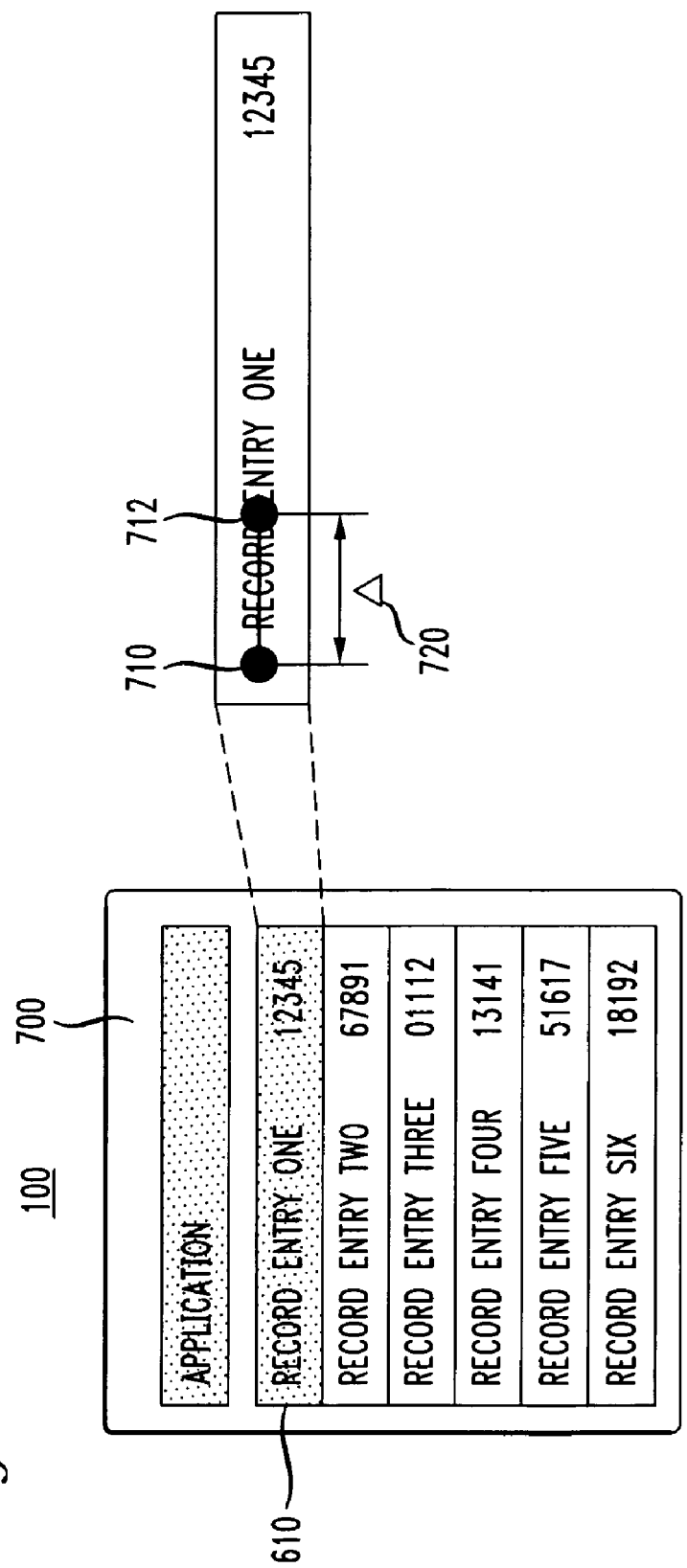
FIG. 7 is a block diagram illustrating the selection of a single record entry, in accordance with an embodiment of the present invention.

In another embodiment, FIG. 7 is a block diagram illustrating the selection of a single record entry on display screen 700 of electronic device 100. In display screen 700, record entry one 610 is selected. The selection is represented in a reverse video format for the line-item of record entry one. It is appreciated that the selection representation can be shown in any number of ways, such as bolding the lettering of the line-item.

Continuing with FIG. 7, an expanded version of record entry one 610 is shown that illustrates the method used for selecting record entry one 610. A gesture of "swiping" the pen, pen down from left to right, horizontally across a line-item (e.g. a record in a calendar or address book) is interpreted as a command to select the entire record. Gestures can be interpreted as an act by the user that is recognized by the electronic device as a command. The electronic device 100 has the intelligence to recognize that the user has placed the stylus 80 at a point outside the line of the text representing the line-item for record entry one 610.

Another way of representing this gesture is the act of putting the pen, or stylus 80, down on the display 105. This point can be captured or registered with digitizer pad located with the display 105. This point 710 marks the first point of contact.

Without lifting the stylus ("pen") 80 off the display 105, the user swipes the stylus 80 across the line-item to a second point of contact 712. This swiping of the pen is shown as a contiguous displacement of the contact point across the line-item representing the record entry. The distance between point 710 and point 712 must exceed a certain distance delta 720 that is empirically determined in order for the electronic system to recognize that record entry one 610 is being selected. Electronic device 100, then automatically selects the entire record of record entry one 620 as is shown by the reverse video of the line-item in display screen 700.

At this point, the selection of record entry one 610 is maintained until an action is performed that is inconsistent with continued selection of record entry one, such as tapping on the display.

The user may stop at the selection of record entry one 610 by simply lifting the stylus 80 off of the display 105. The user may then perform actions on the selected entry, such as deletion, copying, re-categorizing, etc.

It is appreciated, that in another embodiment of the present invention, the gesture of swiping may start outside and to the right side of the line of text representing the selected line-item. Further, the gesture of swiping may go from "right to left" as long as the distance between the first and second contact points exceed the distance delta 720.

Figure 8:
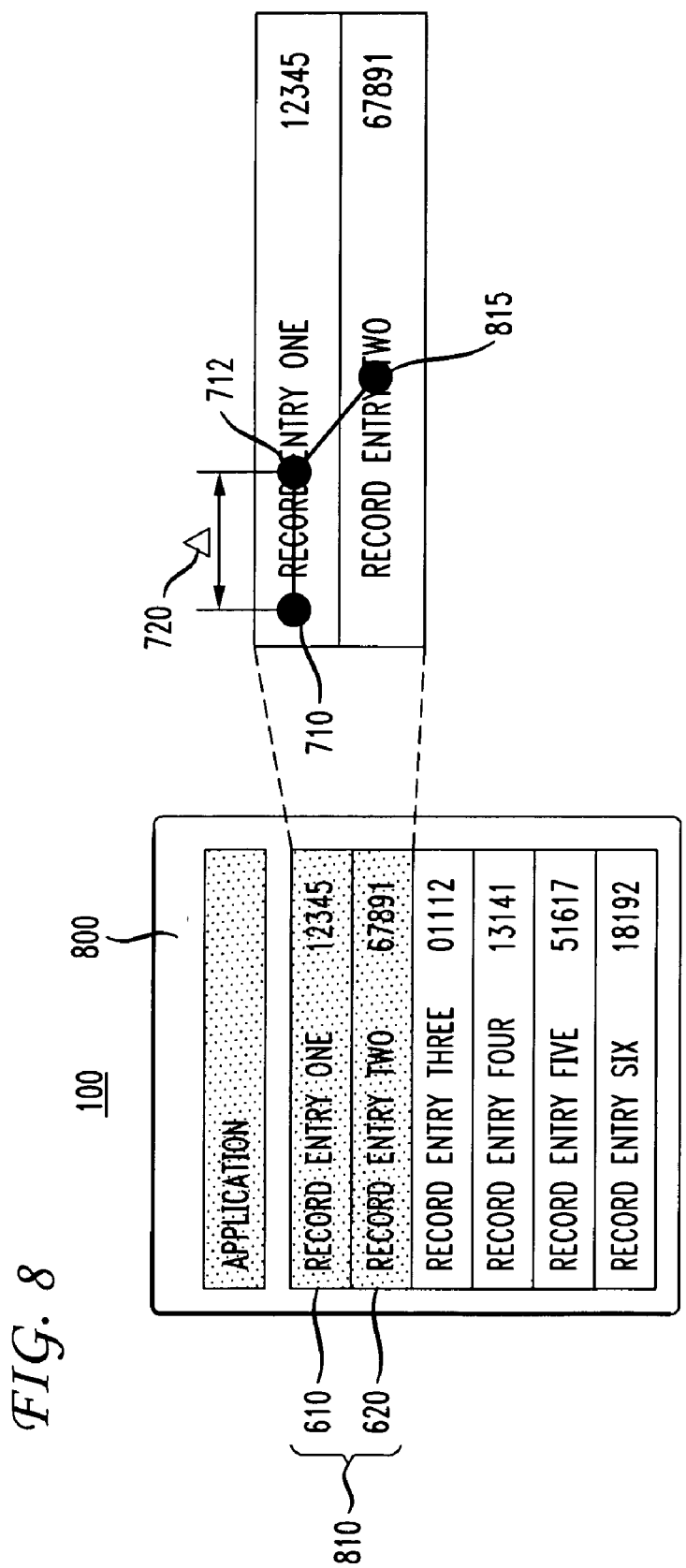
FIG. 8 is a block diagram illustrating the selection of a first group of multiple record entries that are contiguous, in accordance with an embodiment of the present invention.

In another embodiment, FIG. 8 is a block diagram illustrating the selection of a first contiguous group of record entries 810 on display screen 800 of electronic device 100. In display screen 800, record entry one 610 and record entry two 620 are selected. These two entries form a first contiguous group of record entries 810. The selection of the first contiguous group of record entries 810 is represented in a reverse video format for the line-items representing both entries. Again, it is appreciated that the selection representation can be shown in any number of ways, such as bolding the lettering of the line-item.

Continuing with FIG. 8, an expanded version of the first contiguous group of record entries 810 is shown that illustrates the method used for selection. The selection starts by selecting record entry one 610 as discussed above. Continuing from point of contact 712, without lifting the stylus 80 from the display 105, the gesture of "swiping" the pen down vertically to a third point of contact 815, which in this case is located in record entry two 620, is interpreted as a command to select the entire first group of contiguous record entries 810. Swiping the pen is shown as a contiguous displacement of the contact point vertically down through the line-items. The pen is down from the first point of contact 710 to the third point of contact 815. This contiguous group of record entries 810 contains all record entries that are between the second and third points of contact 712 and 815. It is appreciated that the first contiguous group of contiguous record entries may contain one or more record entries.

In another embodiment, it is appreciated that the gesture of swiping vertically may be either up or down on display 105 in order to select multiple record entries, contiguously connected, that are represented in line-item form. Additionally, the vertical movement can support some horizontal movement, in other words, it need not be straight up or down.

At this point, the selection of the first contiguous group of record entries 810 is maintained until an action is performed that is inconsistent with the continued selection, such as tapping on the display 105.

The user may stop at the selection of the first contiguous group of record entries 810 by simply lifting the stylus 80 off of the display 105. The user may then perform actions on the selected entries, such as deletion, copying, re-categorizing, etc.

Figure 9:
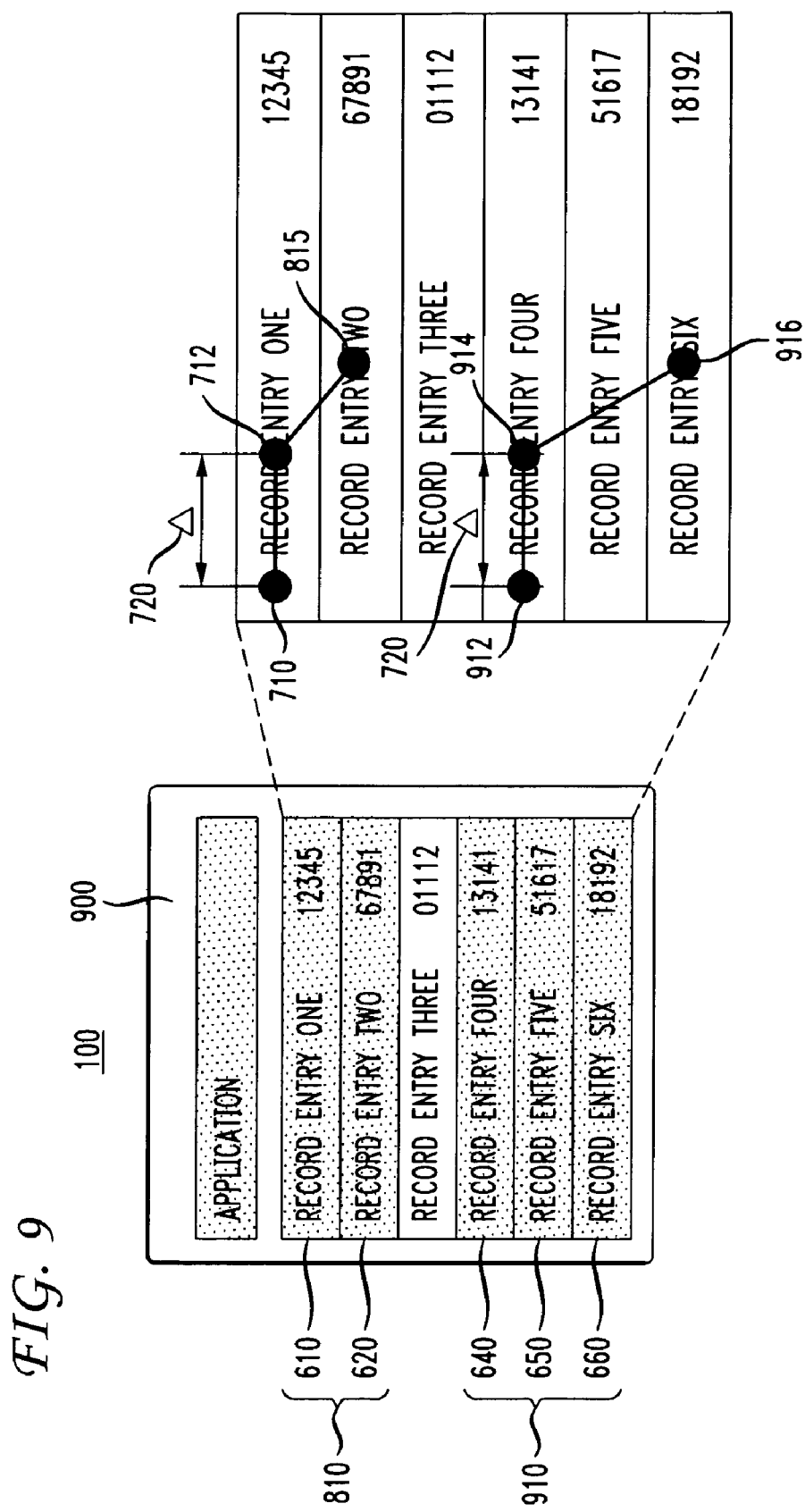
FIG. 9 is a block diagram illustrating the selection of a first and second group of multiple record entries that are discontiguous, in accordance with an embodiment of the present invention.

In another embodiment, FIG. 9 is a block diagram illustrating the selection of a two discontiguous groups of record entries on electronic device 100. In display screen 900, a first contiguous group of record entries 810 is selected. A second contiguous group 910 comprising record entry four 640, record entry five 650, and record entry six 660 is also selected. It is appreciated that the second contiguous group of record entries 910 may contain one or more record entries. The first and second contiguous groups 810 and 910 are discontiguous from each other.

The selection of the first and second contiguous groups of record entries 810 and 910 is represented in a reverse video format for the line-items representing all selected entries. Again, it is appreciated that the selection representation can be shown in any number of ways, such as bolding the lettering of the line-item.

Continuing with FIG. 9, a blown up version of the first and second contiguous groups of record entries 810 and 910 is shown that illustrates the method used for selection. The selection starts by selecting the first contiguous group of record entries 810 as discussed above. However, to further define the boundaries of the first contiguous group of record entries 810, the stylus 80 is lifted off of display 105 at point of contact 815. The selection of the first contiguous group of record entries is maintained until an action is performed that is inconsistent with the continued selection, such as tapping on the display 105.

Continuing with FIG. 9, the selection of the second contiguous group of record entries 910 follows the same method used for selecting the first group of record entries 810. A gesture of "swiping" the stylus 80 from point of contact 912 to point of contact 914 is recognized by the electronic device 100 as a selection of record entry four 640. Swiping the pen is shown as a contiguous displacement of the contact point across the line-item representing the record entry. As stated previously, the second contiguous group of record entries 910 may only contain one record entry, which would be in this case record entry four.

However, to select further contiguous records, from point of contact 914, the electronic device recognizes the vertical gesture of "swiping" the stylus 80 down vertically to point of contact 916 located at record entry six 660 as a command to select the second contiguous group of record entries 910. This gesture is done without lifting the stylus 80 off of the display from point of contact 912 to point of contact 916. Again, swiping of the pen is shown as a contiguous displacement of the contact point vertically through the line-items.

This second contiguous group of record entries 910 contains all record entries that are between points of contact 912 and 916. Essentially, all entries that the stylus 80 passes through on display 105 between points of contact 912 and 916 are selected. The selection occurs automatically as soon as the stylus 80 is registered as passing through or contacting the line-item of a record entry. Thus, record entry four 640, record entry five 650, and record entry six 660 are selected as represented by the reverse video on each of the line-items associated with the selected record entries. Note that record entry three 630 is not selected.

In another embodiment, it is appreciated that the gesture of swiping vertically may be either up or down on display 105 in order to select multiple record entries, contiguously connected, that are represented in line-item form. Additionally, the vertical movement can support some horizontal movement, in other words, it need not be straight up or down.

At this point, the selection of the first and second contiguous group of record entries 810 is maintained until an action is performed that is inconsistent with the continued selection.

The user may stop at the selection of the first and second contiguous groups of record entries 810 and 910 by simply lifting the stylus 80 off of the display 105. The user may then perform actions on the selected entries, such as deletion, copying, re-categorizing, etc. Also, the user may implement the aforementioned method to select further contiguous groups of record entries that are discontiguous from the first and second contiguous groups 810 and 910.

Figure 10:
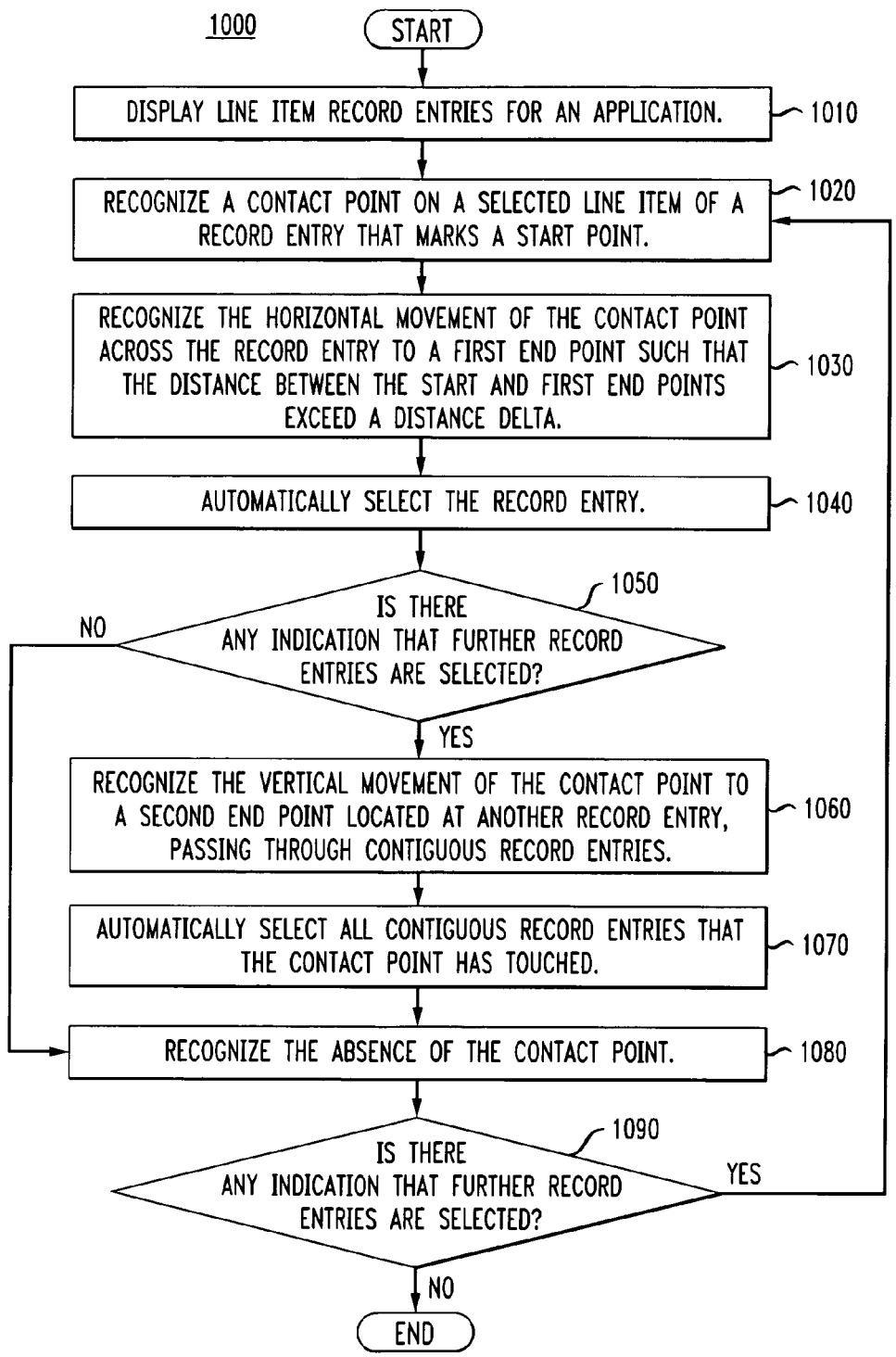
FIG. 10 is a flow diagram illustrating steps in a computer implemented method for selecting record entries in line-item form, in accordance with one embodiment of the present invention.

FIG. 10 illustrates a flow chart of steps in accordance with the selection of records in line-item form. By way of demonstration, FIG. 10 illustrates one embodiment of the present invention whereby record entries in line-item form are selected by a user placing a pen or stylus down on the display to mark a point of contact. The electronic device 100 has the intelligence to interpret certain movements of the point of contact as a selection of the record entries. It is appreciated that selection of the records may be performed in any manner such that the electronic device understands that a point on the display is marked and that the point of contact can be moved from line-item to line-item, such as a mouse/cursor interaction, in accordance with other embodiments.

In step 1010 of process 1000 of FIG. 10, line-item record entries are displayed for a particular application, such as an address book, memo, calendar, etc.

In step 1020 of process 1000, a contact point is recognized on a display, such as the display 105 of electronic device 100. The contact point is of sufficient proximity to be associated with a particular line-item for a first record entry. The contact point marks a start point on the display. In one embodiment, the contact point is made on the display with the tip of the stylus 80.

In step 1030 of process 1000, the horizontal movement of the contact point across the line-item of the first record entry to a first end point is recognized. The contact point has continually been present through steps 1020 and 1030. The distance between the start point and the first end point exceeds a distance delta. The movement of the contact point from the start point to the first end point, where the distance delta is exceeded, is interpreted as a selection of the first record entry.

In step 1040 of process 1000, the first record entry, as a whole is automatically selected. Selection of the first record entry can be displayed in the line-item in any format, such as reverse video.

In step 1050, if there is any indication that further record entries are to be selected at this time, the process 1000 proceeds to step 1060. In step 1060, the vertical movement of the contact point to a second record entry is recognized. The contact point now marks a second end point that is located on the line-item of the second record entry. Movement of the contact point between the first and second end points is interpreted as selection of all contiguous record entries between the first record entry and the second record entries, including the first and second record entries.

In step 1070 of process 1000, the group of contiguous record entries between the first and second record entries, to include the first and second record entries, is automatically selected. Beyond the selection of the first record entry in step 1040, selection occurs as soon as the contact point touches the line-item of each of the selected record entries, until the last selection is automatically made, the second record entry.

It is appreciated that in process 1000, any selection of a record entry is maintained until an action is performed that is inconsistent with the continued selection of the record entry.

In step 1080 of process 1000, the absence of the contact point is recognized.

Returning back to step 1050 of process 1000, if there are no indications that further record entries are to be selected at this time, process 1000 proceeds to step 1080 as described in the previous paragraph.

In step 1090, if there are no indications that further record entries are to be selected at this time, process 1000 ends with the selection of a single record entry, or a contiguous group of record entries. Actions can then be performed on the selected record entries, such as deleting, copying, re-categorizing, etc.

In step 1090, if there is any indication that further record entries are to be selected, then process 1000 returns to step 1020. This step allows for the selection of discontiguous record entries, since all selections of record entries are maintained until an action is performed that is inconsistent with the continued selection of the record entry. Thus, when process 1000 returns back to step 1090 and then ends, multiple discontiguous groups of record entries could eventually be selected. Also, each of these discontiguous groups may contain one or more record entries.

While the methods of embodiments illustrated in process 1000 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The instructions for the steps, and the data input and output from the steps of process 1000 may be implemented utilizing processor 101 and ROM memory 103 and RAM memory 102, as shown in FIG. 5. Furthermore, other types of memory storage can be utilized to accomplish the aforementioned such as a hard drive, a CD ROM, flash memory, or any compact integrated circuit memory storage device.

The preferred embodiment of the present invention, a method and system for selecting records displayed in line-item format, is thus described. While the present invention has been described in particular embodiments, it should be appreciated that the present invention should not be construed as limited by such embodiments, but rather construed according to the below claims.

What is claimed is:

1. A method of record selection for selecting multiple non-contiguous groups of contiguous record entries, the method comprising:
    displaying a plurality of record entries on a display in line-item form;
    selecting a first contiguous group of the record entries the selecting comprising:
        selecting a first record entry of the first continuous group of the record entries, the selecting the first record entry comprising:
            marking a first start point on the first record entry by recognizing only a contact point on said display upon which physical contact is made with said display, and
            recognizing a contiguous displacement of said contact point on said display horizontally across said first record entry to a first end point, to cause automatic selection of the second record entry;

recognizing a contiguous displacement of said contact point to a second record entry said contact point continuing through as many contiguous record entries as displayed on said display between said first and said second record entries, automatically selecting the first contiguous group of record entries comprising the first record entry, the second record entry, and any contiguous ones of the record entries as displayed therebetween;

after performing the selecting of the first contiguous group of the record entries, selecting a second contiguous group of the record entries, the second contiguous group of the record entries being non-contiguous to the first contiguous group of the record entries, the selecting of the second contiguous group of the record entries comprising:

selecting a third record entry of a second contiguous group of the record entries, the selecting the third record entry comprising:

marking a second start point on the third record entry by recognizing only a second contact point on said display upon which physical contact is made with said display, the third record entry being non-contiguous to the first group of continuous record entries, and recognizing a contiguous displacement of said second contact point on said display horizontally across said third record entry to a second end point, to cause automatic selection of the second record entry;

recognizing a contiguous displacement of said second contact point to a fourth record entry, said second contact point continuing through as many contiguous record entries as displayed on said display between said third and said fourth record entries, and automatically selecting the second contiguous group of record entries comprising the third record entry, the fourth record entry, and any contiguous ones of the record entries as displayed therebetween, wherein the second contiguous group of ones of the record entries is non-contiguous to the first contiguous group of ones of the record entries.

2. A method as described in claim 1, wherein said first start point is located to the left of said first end point as displayed upon said display.

3. A method as described in claim 1, wherein said first start point is located to the right of said first end point as displayed upon said display.

4. A method as described in claim 1, wherein said contact point is made by putting a stylus down on said display.

5. A method as described in claim 1, further comprising displaying in reverse video format the selection of said first record entry in line-item form.

6. A method as described in claim 1, wherein said second start point is located to the left of said second end point as displayed upon said display.

7. A method of record selection for selecting non-contiguous record entries, the method comprising:

displaying a plurality of record entries in line-item form on a display;

recognizing only pressure captured on a digitizer marking a first start point on a first record entry;

recognizing a contiguous displacement of said pressure horizontally across said first record entry, to a first end point, to cause actomatic selectin of the first entry;

recognizing only pressure captured on a digitizer marking a second start point on a second record entry the second record entry being non-contiguous to the first record entry;

recognizing a contiguous displacement of said pressure horizontally across said second record entry to a second end point, to cause automatic selection of the second record entry; and in addition to the already selected first record entry.

8. A method as described in claim 7, wherein said pressure is made by putting a stylus down on said display.

9. A method as described in claim 7, said method further comprising:

after performing the recognizing of the contiguous displacement of said pressure horizontally across said first record entry to a first end point, recognizing a contiguous displacement of said pressure on said display to a third record entry, said pressure continuing through any contiguous ones of the record entries between said first and said third record entries, forming a first contiguous group of record entries comprising said first and said third record entries and any of the contiguous ones of the record entries as displayed on said display therebetween; and automatically selecting each of the record entries of said first contiguous group of record entries beyond said first record entry as said pressure touches each respective one of the record entries of said first contiguous group of record entries including said third record entry.

10. A method as described in claim 9, said method comprising:

recognizing an absence of said pressure marking a third end point located at said third record entry, the third end point marking an end of the first contiguous group of record entries.

11. A computer system as described in claim 7, further comprising displaying in reverse video format the selection of said first record entry in line-item form.

12. A computer system as described in claim 7, wherein said second start point is located to the left of said second end point as displayed upon said display.

13. A computer system comprising a processor, a memory, a display screen and a digitizer, wherein said memory includes instructions that when executed implement a method of record selection comprising:

displaying a plurality of record entries on a display in line-item form;

selecting a first continuous group of the record entries, the selecting comprising selecting a first record entry of the first contiguous group of the record entries, the selecting the first record entry comprising:

marking a first start point on the first record entry by recognizing only a contact point on said display upon which physical contact is made with said display, and recognizing a contiguous displacement of said contact point on said display horizontally across said first record entry to a first end point, to cause automatic selection of the first record entry;

recognizing a continuous displacement of said contact point to a second record entry, said contact point continuing through as many contiguous record entries as displayed on said display between said first and said second record entries, automatically selecting the first continuous group of record entries comprising the first record entry, the second record entry, and any contiguous ones of the record entries as displayed therebetween;

after performing the selecting of the first contiguous group of the record entries, selecting a second contiguous group of the record entries, the second contiguous group of the record entries being non-contiguous to the first contiguous group of the record entries, the selecting of the second contiguous group of the record entries comprising:

selecting a third record entry of a second continuous group of the record entries, the selecting the third record entry comprising:

marking a second start point on the third record entry by recognizing only a second contact point on said display upon which physical contact is made with said display, the third record entry being non-contiguous to the first group of record entries, and recognizing a contiguous displacement of said second contact point on said display horizontally across said third record entry to a second end point, to cause automatic selection of the third record entry;

recognizing a contiguous displacement of said second contact point to a fourth record entry, said second contact point continuing through as many contiguous record entries as displayed on said display between said third and said fourth record entries, and automatically selecting the second contiguous group of record entries comprising the third record entry, the fourth record entry, and any contiguous ones of the record entries as displayed therebetween, wherein the second contiguous group of ones of the record entries is non-contiguous to the first contiguous group of ones of the record entries.

14. A computer system as described in claim 13, wherein said first start point is located to the left of said first end point as displayed upon said display, said first start point located outside text associated with said first record entry.

15. A computer system as described in claim 13, wherein said first start point is located to the right of said first end point as displayed upon said display, said first start point located outside text associated with said first record entry.

16. A computer system as described in claim 13, wherein said contact point is made by putting a stylus down on said display.

* * * * *